United States Patent
Straub et al.

(10) Patent No.: US 9,287,989 B2
(45) Date of Patent: Mar. 15, 2016

(54) OPTICAL DATA TRANSMISSION DEVICE

(71) Applicant: Alcatel Lucent, Boulogne-Billancourt (FR)

(72) Inventors: Michael Straub, Stuttgart (DE); Joerg Hehmann, Stuttgart (DE); Rudi Vankeirsbilck, Antwerp (BE); Stijn Meersman, Antwerp (BE); Yannick Clybouw, Ghent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/399,330
(22) PCT Filed: Apr. 19, 2013
(86) PCT No.: PCT/EP2013/058132
§ 371 (c)(1),
(2) Date: Nov. 6, 2014
(87) PCT Pub. No.: WO2013/178403
PCT Pub. Date: Dec. 5, 2013

(65) Prior Publication Data
US 2015/0117854 A1    Apr. 30, 2015

(30) Foreign Application Priority Data
May 29, 2012  (EP) .................................... 12305591

(51) Int. Cl.
*H04B 10/08*    (2006.01)
*H04B 10/50*    (2013.01)
(Continued)

(52) U.S. Cl.
CPC ......... *H04B 10/503* (2013.01); *G01M 11/3118* (2013.01); *G01M 11/3127* (2013.01); *H04B 10/071* (2013.01); *H04B 10/079* (2013.01)

(58) Field of Classification Search
CPC .. H04B 10/079; H04B 10/071; H04B 10/073; H04B 10/075; H04B 10/0791; H04B 10/07957; H04B 10/0793; H04B 10/0771; H04B 10/0775
USPC ............. 398/16, 10, 13, 17, 9, 20, 21, 22, 23, 398/24, 25, 30, 31, 33, 38, 72; 356/73.1
See application file for complete search history.

(56) References Cited

U.S. PATENT DOCUMENTS

| 7,684,699 B2 * | 3/2010 | Schmuck ............... H04B 10/40 398/22 |
| 8,452,173 B2 * | 5/2013 | Hehmann ............ H04B 10/079 398/16 |

FOREIGN PATENT DOCUMENTS

| JP | 2001305017 A | 10/2001 |
| JP | 2007082202 A | 3/2007 |

(Continued)

OTHER PUBLICATIONS

Thollabandi at al., "Tunable OTDR Based on Direct Modulation of Self-Injection-Locked RSOA for In-service Monitoring of WDM-PON", IEEE Photonics Technology Letters, IEEE Service Center, vol. 20, No. 15, Aug. 2008, pp. 1323-1325.

(Continued)

*Primary Examiner* — Hanh Phan
(74) *Attorney, Agent, or Firm* — Harness, Dickey & Pierce, P.L.C.

(57) ABSTRACT

Proposed is an optical data transmission device for an optical access network that comprises a laser transmission unit, which generates an optical transmission signal, and a driving unit, which controls the laser transmission unit for modulating the transmission signal. The device comprises an optical reception unit that converts the received optical signal into an electrical measurement signal. For this, the reception unit contains a photo-diode and an electrical amplifier. The optical reception unit is separate from the laser transmission unit. A control unit controls the laser transmission unit, such that the optical transmission signal is modulated in dependence on a measurement signal. The control unit measures multiple electrical measurement signals during a measurement interval and determines an averaged received electrical measurement signal. Even furthermore, the control unit controls the electrical amplifier, such that the electrical amplifier is turned off during a time interval prior to the measurement interval.

14 Claims, 2 Drawing Sheets

(51) Int. Cl.
*H04B 10/071* (2013.01)
*G01M 11/00* (2006.01)
*H04B 10/079* (2013.01)

(56) References Cited

FOREIGN PATENT DOCUMENTS

| JP | 2007151086 A | 6/2007 |
|---|---|---|
| JP | 2012074794 A | 4/2012 |
| KR | 20080050292 A | 6/2008 |
| KR | 20100121947 A | 11/2010 |
| KR | 20110008891 A | 1/2011 |
| WO | WO-2011123687 A1 | 10/2011 |

OTHER PUBLICATIONS

Shin W et al., "Wavelength tunable optical time-domain reflectometry based on wavelength swept fiber laser empoying two-dimensional digital micro-mirror array", Optics Comminucations, North-Holland Publishing Co., vol. 282, No. 6, Mar. 2009, pp. 1191-1195.
International Search Report PCT/ISA/210 for International Application No. PCT/EP2013/058132 Dated Apr. 19, 2013.
Written Opinion of the International Searching Authority PCT/ISA/237 for International Application No. PCT/EP2013/058132 dated Apr. 19, 2013.

* cited by examiner

OPTICAL DATA TRANSMISSION DEVICE

FIELD OF THE INVENTION

The invention relates to the field of telecommunications, and in particular to a device of and a method for optical data transmission in an optical access network.

BACKGROUND

These days, access networks, also called passive optical networks (PON), are used, for connecting a plurality of customers to a core network of data transportation.

In such an access network, the interconnection between the core network and the access network is given at a so-called central office, which contains an optical line terminal (OLT).

The OLT is connected via at least one optical fiber, preferably called optical feeder fiber, to a so-called remote node. At this remote node, an optical downlink signal transmitted by the OLT is split onto different optical branches, to which one or more customers are connected by means of optical network units (ONU).

The customers send via the optical branches optical uplink signals towards the remote node, which combines these optical uplink signals to a combined uplink signal and transmits this via the optical feeder fiber to the optical line terminal.

In order to determine the transmission properties of the transmission channel into which a device transmits an optical signal, a measurement technique of optical time domain reflectometry (OTDR) can be applied. In such an OTDR measurement, a reflection profile of the transmission channel is estimated. Preferably, the technique of OTDR is carried out at the OLT.

For the purpose of OTDR, a measurement signal in the form of an optical pulse may be transmitted into the optical channel. The received response signal, which is reflected by the optical channel, can then be traced in the time domain, for determining the reflection profile.

In a more advanced technique of OTDR, a measurement signal may be generated as an optical signal carrying a correlation sequence. The received response signal is then recorded and used for determining the reflection profile. The reflection profile can be determined, by correlating a sampled version of the received response signal with the initial correlation sequence itself. In the case, that the auto-correlation function of the correlation sequence is equal to or approximated by the dirac delta function, the result of the correlation yields an estimate of the impulse response of the optical channel in the time domain, which is an approximation of the reflection profile.

When transmitting an optical transmission signal carrying transmission data into the optical channel using a transmission device, it is one possibility to carry out the technique of OTDR by using a separate device. The transmission device and the separate OTDR device are in this case both coupled to the same optical channel, preferably via an optical coupler. The optical channel is preferably an optical fiber connected to the devices.

A more advanced technique is that of embedded OTDR, in which the transmission device itself contains the hardware for generating the optical transmission signal as well as the hardware that is necessary for carrying out an OTDR measurement. Preferably, the optical transmission signal is directly modulated in dependence on a correlation sequence, wherein the frequency of this direct modulation is chosen such that it does not disturb data reception at a receiving side. After transmitting the optical transmission signal, carrying the directly modulated measurement signal, into the optical channel, the response signal of the optical channel can be obtained, by filtering out from received optical signal that frequency, at which the optical transmission signal was modulated.

This received response signal can then be used for determining a reflection profile via the technique of signal correlation as it has been described previously above.

SUMMARY

It is an aim of the invention, to improve optical data transmission devices, which carry out embedded OTDR measurement.

Proposed is an optical data transmission device for an optical access network. The device comprises a laser transmission unit, which is operable to generate an optical transmission signal. Furthermore, the device comprises a driving unit, which is operable to control the laser transmission unit, such that the optical transmission signal is modulated in dependence on a data signal, which is preferably an electrical data signal.

Furthermore, the device comprises an optical reception unit, which is adapted to convert at least a fraction of a received optical signal into an electrical measurement signal. For this conversion, the optical reception unit contains and makes use of a photo-diode and an electrical amplifier, which are both an integral part of the optical reception unit. The optical reception unit is furthermore separate from the laser transmission unit.

The device comprises furthermore at least one control unit, which is operable to control the laser transmission unit, such that the optical transmission signal is modulated in dependence on a measurement signal.

The control unit is furthermore operable to measure multiple electrical measurement signals during a measurement interval and to determine an averaged received electrical measurement signal based on the measured electrical signals.

Even furthermore, the control unit is operable to control the electrical amplifier, such that the electrical amplifier is turned off during at least a fraction of a time interval, which is prior to the measurement interval.

In order to grasp the advantages of the proposed device, the following aspects have to be taken into consideration.

When generating the optical transmission signal using the laser transmission unit, this optical signal may have a fixed wavelength with a narrow line width, preferably called bandwidth.

The wavelength is fixed, in the sense that for a given constant temperature of the laser transmission unit also the wavelength is constant.

When transmitting an optical signal with a narrow line and a fixed center wavelength into the optical channel, this may result in coherent Raleigh noise present within the received response signal. Such coherent Raleigh noise will then inevitably degrade the accuracy of the measurement. One possibility to reduce the coherent Raleigh noise would be, to use an optical transmission signal with a broader line width, but this will in turn cause limitations for the data transmission due to the dispersion effect present within the optical channel.

Another counter measure for reducing the coherent Raleigh noise is achieved by the proposed device in the following way:

By turning the electrical amplifier off during a time interval prior to the measurement interval, and then turning the electrical amplifier on for the time of the measurement interval, the electrical amplifier will generate thermal energy within the optical reception unit. This thermal energy may then dissipate from the optical reception unit to the laser transmission unit, where it then may cause a temperature change and thus also a change of the optical center wavelength at which the laser transmission unit generates the optical transmission signal. The change of the optical signal's center wavelength used for data transmission as well as OTDR measurement will in turn reduce the impact of coherent Raleigh noise onto the measurement during the measurement interval.

The proposed device has the advantage, that no extra thermoelectric cooler or thermoelectric heater has to be foreseen within or directly at the laser transmission unit for changing the temperature in order to change the center wavelength of the generated optical signal. Instead, the thermal energy of the electrical amplifier can be used for this. This allows a higher degree of integration within the optical transmission device. Since the electrical amplifier is already present anyway within the optical reception unit for converting the received optical signal into an electrical measurement signal, no extra component has to be foreseen within the optical transmission device for generating thermal energy in order to cause a temperature change of the laser transmission unit for achieving a change of the center wavelength. All that has to be foreseen is, that the control unit is operable to turn the amplifier off during a time interval prior to the measurement interval. Thus, no additional costs and no extra electronic board nor optical sub module dimension increase are required. Even furthermore, no extra power supply for any extra thermo electrical cooler or heater has to be foreseen. This even allows a higher integration of the embedded OTDR system, preferably into a small factor pluggable optical transceiver module.

DESCRIPTION OF EMBODIMENTS

Figure 1:
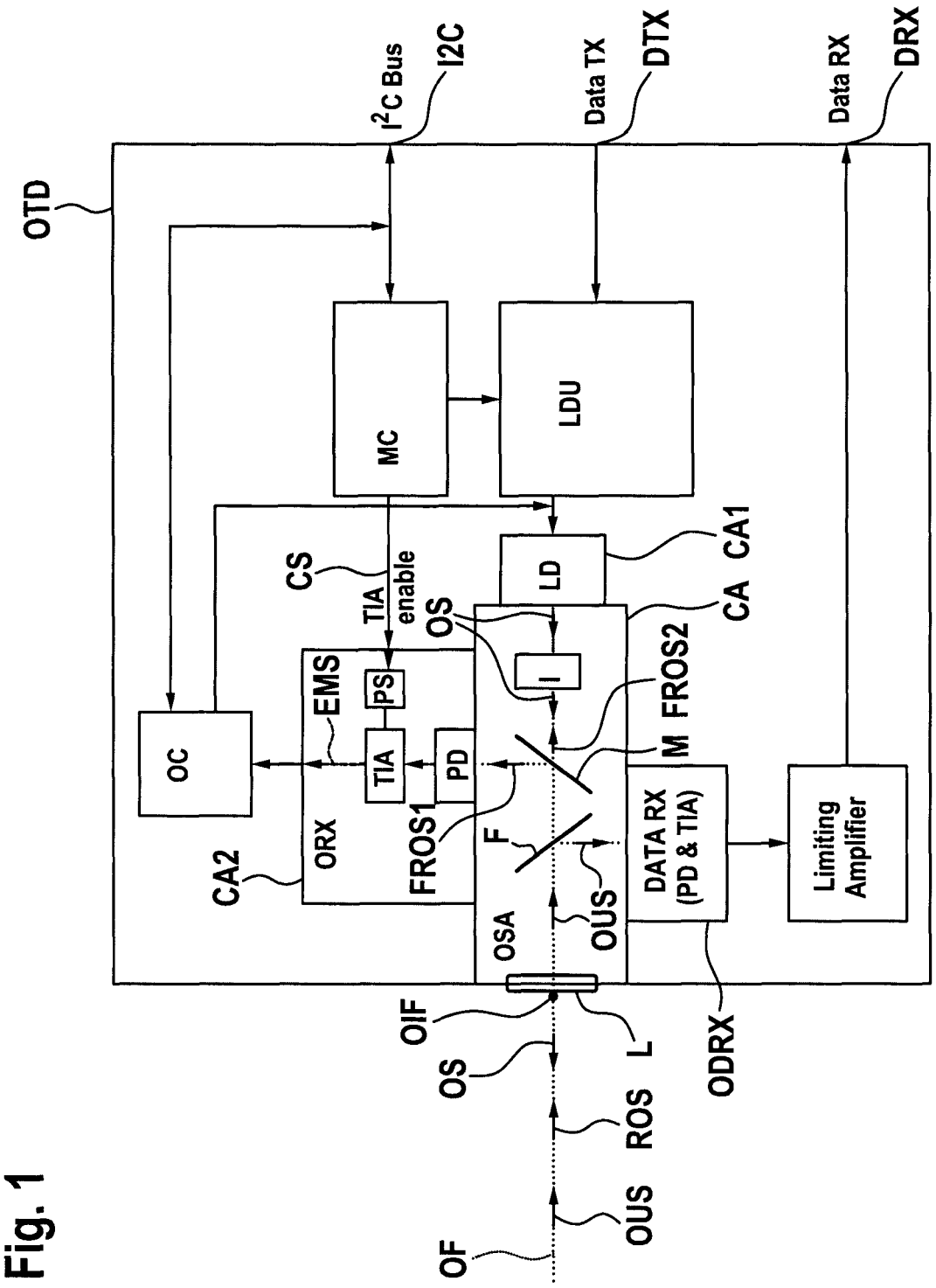
FIG. 1 shows a proposed optical transmission device according to an embodiment.

FIG. 1 shows an optical transmission device OTD, which is preferably used within an optical line terminal of an optical access network.

The device OTD contains a laser transmission unit LD, which is preferably a laser diode. Preferably, the laser transmission unit LD is a semiconductor laser, which may be in a preferred embodiment a distributed feedback (DFB) laser. The transmission unit LD generates an optical signal OS, which has a center wavelength and a line width. The optical signal OS is transmitted into an optical sub assembly OSA. The optical signal OS passes an optical isolator I as well as an optically partially transmitting device M and an optical filter F towards an optical interface OIF, at which preferably a lens L is located. Instead of a lens L, shown in this preferred embodiment of FIG. 1, the optical interface OIF may contain a plug for connecting an optical fiber, or as an even further alternative a so call fiber pigtail.

The optical isolator I transmits optical signals propagating from the transmission unit LD towards the lens L, while it suppresses a transmission of optical signals propagating from the lens L towards the transmission unit LD.

The optically partially transmitting device M is preferably an optically partially reflecting mirror, which allows a greater fraction of the signal OS to propagate in the direction from the transmission unit LD towards the lens L, while it reflects a smaller fraction of the signal OS propagating in this direction. Furthermore, this mirror allows a greater fraction of an optical signal to propagate from the lens L towards the transmission unit LD, while it reflects a smaller fraction of such a signal propagating in this direction. As an example, 90% of the energy of an optical signal are transmitted by the optically partially reflecting mirror, while 10% of the energy of an optical signal are reflected by the optically partially reflecting mirror.

The optically partially transmitting device M is alternatively an optical wavelength division multiplex (WDM) tap coupler. Such a tap coupler transmits optical signals in the direction of the optical signal OS for first predefined wavelength or wavelength range, while it suppresses transmission optical signals in this direction for a second predefined wavelength or wavelength range. Preferably, the first predefined wavelength is coincident with the wavelength of the optical signal OS. Furthermore, the tap coupler transmits optical signals in the direction from the lens L towards the transmission unit LD for the second wavelength or wavelength range, while it directs optical signals coming from the lens L towards the reception unit ORX for the first predefined wavelength or wavelength range.

The optical filter F allows optical signals to propagate from the transmission unit LD towards the lens L. The filter F filters optical signals propagating from the lens L towards the filter F in the way, that optical signals having the wavelength of the transmitted optical signal OS pass the filter F towards the optically partially transmitting device M, while optical signals of a different wavelength are reflected by the filter F towards an optical data reception unit ODRX.

Preferably, the optical transmission signal OS is a downlink signal with a wavelength of 1490 nm, while an optical uplink signal OUS, which is preferably a combined uplink signal, received at the device OTD, preferably from other units of a network, has a wavelength of 1310 nm.

The optical transmission device OTD is connectable at the lens L to an optical fiber OF, into which the device OTD transmits the transmission signal OS and receives the optical uplink signal OUS. The lens L can be seen as an optical interface of the device OTD.

The laser transmission unit LD is controlled by a driving unit LDU, such that the optical transmission signal OS is modulated in dependence on an electrical data signal. The electrical data signal is preferably received at the device OTD via a data interface DTX.

The control unit OC controls the laser transmission unit, LD, such that the optical transmission signal OS is modulated in dependence on a measurement signal. The measurement signal is preferably a digital electrical signal representing a correlation sequence.

The laser driving unit LDU provides an electrical bias signal to the transmission unit LD for power adjustment as well as an electrical modulation signal for modulating the optical signal OS in dependence on digital data received at the driving unit LDU. This data is preferably received at the device OTD via a data interface DTX.

The laser driver LDU itself is controlled by a control unit MC, which is preferably a micro controller, wherein the unit MC controls a working point of the driving unit LDU. Furthermore, the unit MC controls the driving unit LDU, such that temperature compensation is carried out.

The modulation of the transmission signal OS in dependence on the measurement signal is preferably carried out, by using as a correlation sequence a pseudo-random bit sequence. This bit sequence has a pre-defined bit rate, which is preferably a bit rate of 10 MHz. The bit sequence has preferably a length of $2^{11}-1$.

The device OTD receives from the fiber OF at the lens L a response signal ROS of the optical channel. This signal ROS then passes the optical filter F. A fraction FROS1 of this signal ROS is reflected or suppressed by the optically partially transmitting device M towards an optical reception unit ORX. A remaining fraction FROS2 of the signal ROS is transmitted by the optically partially transmitting device M towards the isolator I, which suppresses this remaining fraction FROS2, such that it does not reach the laser unit LD. Preferably, in the case that the optically partially transmitting device M is a tap coupler, the signal fraction FROS1 has a wavelength that is coincident with the first predefined wavelength or wavelength range, while the signal fraction FROS 2 has wavelength that is coincident with the second predefined wavelength or wavelength range.

The laser transmission unit LD is controlled by a control unit OC, such that the transmission signal OS is modulated in dependence on a measurement signal. Within the optical reception unit ORX, the fraction FROS1 of the received optical signal is converted into an electrical measurement signal EMS. For this purpose, the reception unit ORX contains a photo diode PD, which converts the signal fraction FROS1 into an electrical signal, as well an amplifier TIA, which amplifies the converted electrical signal for obtaining the electrical measurement signal EMS. The amplifier TIA is preferably a transimpedance amplifier. The amplifier TIA uses preferably electrical energy provided by a power supply PS.

The modulation of the transmission signal OS in dependence on the measurement signal is preferably an amplitude modulation. Furthermore, the modulation of the optical signal OS in dependence on the received data is also an amplitude modulation at a predefined bit rate using on and off keying. This on and off keying is preferably carried out at a bit rate of 2.5 Gigabits per second.

The amplitude, by which the optical signal OS is modulated in dependence on the measurement signal, is preferably within the range of 5 to 10% of the optical signal's OS maximal amplitude.

Within a measurement interval, the measurement signal is modulated onto the optical signal OS successively multiple times. Within this measurement interval, the optical reception unit ORX thus measures multiple electrical measurement signals, by converting a fraction of the received optical signal FROS1 to these respective electrical measurement signals. The multiple electrical measurement signals are then provided to an OTDR control unit OC, which stores these multiple electrical measurement signals and determines an average received electrical measurement signal based on the measured electrical signals. This averaging may be an unweighted or a weighted averaging. By this way of measurement including averaging of multiple received measured signals, an increased accuracy of the measurement is achieved in comparison to a way measurement consisting of only one single measurement.

The averaged received electrical measurement signal determined within the control unit OC may then be provided via a data bus I2C to a device, not explicitly shown in FIG. 1. Such a device may the correlate the averaged measurement signal with the correlation sequence itself for finally determining a reflection profile of the optical channel. Alternatively, this correlation may be carried out directly within the control unit OC.

The control unit MC controls the amplifier TIA, such that the amplifier TIA is turned off during at least a fraction of a time interval prior to the measurement interval.

For this purpose, the control unit MC is connected to a power supply PS of the amplifier TIA via an electrical connection. For turning the power supply PS on and off, the control unit MC sends an electrical control signal CS, also shown as "TIA enable", to the power supply PS. By turning on and off the power supply PS of the amplifier TIA, also the amplifier TIA is turned on and off in dependence on the control signal CS sent by the control unit MC.

Alternatively, instead of turning on and off the power supply PS as a separate power supply of the amplifier TIA, the control unit MC is connected electrically directly with the amplifier TIA, wherein the amplifier TIA provides an interface, preferably a PIN-connection not explicitly shown in FIG. 1, at which an electrical control signal can turn the amplifier TIA directly on and off.

As it has been described previously above, the amplifier TIA will generate thermal energy when it is turned on. Thus, by turning the amplifier TIA on and off during different intervals of measurement and non-measurement, the amount of thermal energy present within the reception unit ORX can be varied. Furthermore, the thermal energy present within the reception unit ORX may dissipate from the reception unit ORX towards the separate laser transmission unit LD. Thus, by turning on and off the amplifier TIA during different intervals, the amount of thermal energy present within the transmission unit LD due to thermal energy dissipation can be varied. Thus, a change or variation of the center wavelength of the optical transmission signal generated by the transmission unit LD can be achieved.

The reception unit ORX and the laser transmission unit LD are separate in the sense, that they have respective casings that are not directly connected to each other. These casing may preferably be indirectly connected to each other via a casing of an optical sub assembly (OSA), which will be described in detail further below.

Figure 2:
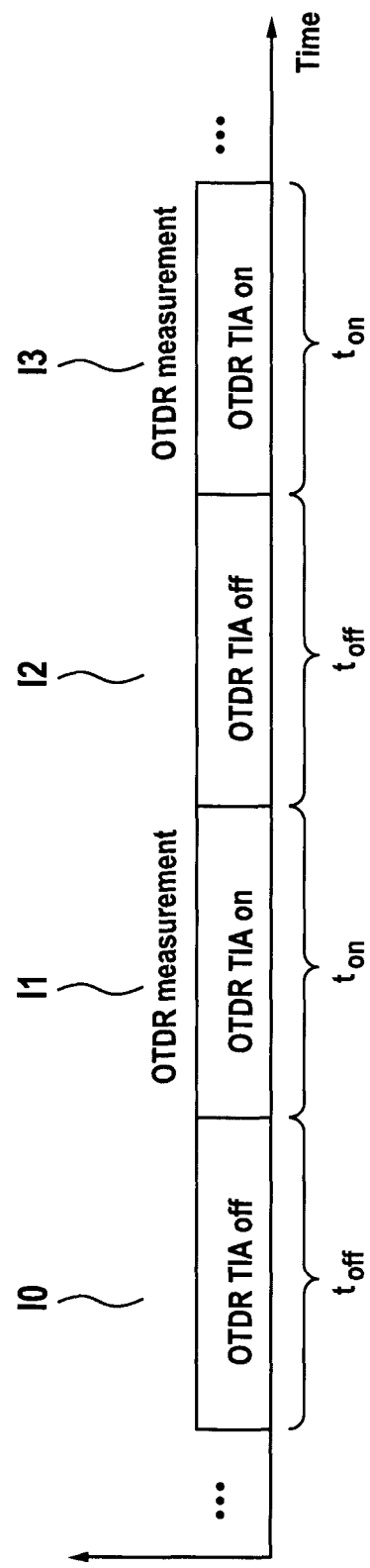
FIG. 2 shows alternating time intervals of measurement and non-measurement.

FIG. 2 shows different time intervals of measurement and non-measurement.

Due to the fact, that a measurement of a reflection profile does not have to be carried out at all times when operating the transmission device within the network, the amplifier for measuring the electrical measurement signals within the reception unit has to be turned on only during such time intervals, during which a measurement of the reflection profile shall be carried out.

Within a measurement interval I1, measurement is carried out and therefore, the amplifier is turned on. During the time interval I0 of non-measurement, no OTDR measurement is to be performed, and thus the amplifier is turned off during this time interval of non-measurement. The amplifier does not have to be turned off during the whole time interval I0, but may preferably be turned off only during a fraction the time interval I0 of non-measurement.

During the time interval I1 of OTDR measurement, preferably a number of $2^{18}$ correlation sequences are transmitted, such that an averaged electrical measurement signal is based on $2^{18}$ individual electrical measurement sequences.

Preferably, the time interval I1 of measurement is followed by another time interval I2 of non-measurement, which then is followed by a further time interval I3 of measurement.

During at least a fraction of the time interval I2 of non-measurement, the control unit controls the amplifier, such that it is turned off during at least a fraction of the time interval I2.

During the time interval of measurement I3 the amplifier is turned on under control of the control unit.

Coming back to FIG. 1, the turning on and off of the amplifier TIA during the respective time intervals, as previously described, may be carried out by a software task running on the control unit MC.

While the control unit MC is preferably a micro controller, the control unit OC is preferably implemented as an application specific integrated circuit (ASIC).

The control units MC and OC may be provided as separate control units or alternatively as one control unit. The control units OC and MC may be implemented as a common control unit or separate control units relying on different combinations of hardware and/or software.

The optical subassembly OSA is optically connected to the laser transmission unit LD and the optical reception unit ORX. Thus, the optical subassembly OSA is able to provide the optical transmission signal OF to an optical interface OIF, preferably given by the lens L.

Furthermore, the optical subassembly OSA is able to receive the received optical signal ROF from the optical interface OIF.

The optical subassembly OSA is preferably a hermetically sealed device with a casing CA. To this casing, the transmission unit LD and the reception unit ORX are mechanically connected. Furthermore, also an optical data reception unit ODRX is mechanically connected to the subassembly OSA.

The optical sub-assembly may have a casing CA made of plastic. According to an alternative, the casing CA of the subassembly OSA is a metallic casing, which provides the advantage of allowing a faster thermal energy dissipation from the reception unit ORX towards the transmission unit LD. This is especially of advantage in the case, that the reception unit ORX and the transmission unit LD are both sealed in respective metallic cases CA1, CA2, which are welded to the casing CA of the subassembly OSA.

The transmission unit OTD contains preferably the optical data reception unit ODRX, which receives data via the uplink signals OUS. The optical data reception unit ODRX may also make use of a photo diode as well as an amplifier for deriving from the optical uplink signal OUS received data, which then may be provided to a data interface DRX.

The proposed device discloses also a method of optical data transmission, as claimed in an independent claim, which comprises different steps corresponding to the independent claim claiming the proposed device.

The functions of the various elements shown in the FIG. 1, including any functional blocks labeled as 'control unit', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'control unit' should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non volatile storage. Other hardware, conventional and/or custom, may also be included.

The invention claimed is:

1. Optical data transmission device for an optical access network,
comprising
a laser transmission unit, operable to generate an optical transmission signal,
at least one driving unit, which is operable to control said laser transmission unit, such that said optical transmission signal is modulated in dependence on a data signal,
an optical reception unit, adapted to convert at least a fraction of a received optical signal into an electrical measurement signal, using a photo diode and an electrical amplifier, wherein said optical reception unit is separate from said laser transmission unit,
at least one control unit, operable to control said laser transmission unit, such that said optical transmission signal is modulated in dependence on a measurement signal,
wherein said control unit is furthermore operable
to measure multiple electrical measurement signals during a measurement interval and to determine an averaged received electrical measurement signal based on the measured signals,
and to control said electrical amplifier, such that said electrical amplifier is turned off during at least a fraction of a time interval prior to said measurement interval.

2. Optical data transmission device according to claim 1, wherein said control unit is connected to a power supply of said electrical amplifier by an electrical connection,
and wherein said control unit turns said electrical amplifier off, by turning off said power supply of said electrical amplifier via said electrical connection.

3. Optical data transmission device according to claim 1, wherein said control unit is connected to said electrical amplifier by an electrical connection,
and wherein said control unit turns off said electrical amplifier via said electrical connection.

4. Optical data transmission device according to claim 1, wherein said laser transmission unit and said optical reception unit are optically connected to an optical sub assembly, which is operable
to provide said optical transmission signal to an optical interface
and to receive said received optical signal from said optical interface.

5. Optical data transmission device according to claim 4, wherein said laser transmission unit and said optical reception unit are mechanically connected to said optical sub assembly.

6. Optical data transmission device according to claim 5, wherein said optical sub assembly is encapsulated in a metallic casing.

7. Optical data transmission device according to claim 1, wherein said control unit is operable to control said electrical amplifier during alternating time intervals of non-measurement and measurement, such that said electrical amplifier is turned off during at least respective fractions of time intervals of non-measurement.

8. Optical data transmission device according to claim 1, wherein said measurement signal represents a bit sequence with a predefined bitrate.

9. Optical data transmission device according to claim 1, wherein said driving unit is operable to control said laser transmission unit, such that said optical signal is modulated in dependence on said data signal using on-off keying.

10. Optical data transmission device according to claim 1, wherein said control unit is furthermore operable to provide a measurement data signal representing said averaged received electrical measurement signal to a data bus.

11. Optical data transmission device according to claim 1, wherein said control unit is operable to control a working point of said driving unit.

12. Optical data transmission device according to claim 1, comprising furthermore an optical data reception unit, wherein said laser transmission unit is operable to transmit said optical signal at a first wavelength, and wherein said optical data reception unit is operable to receive data via the received optical signal at a second wavelength, different from said first wavelength.

13. Optical data transmission device according to claim 1, wherein said control unit turns said electrical amplifier indirectly off, by turning off a power supply of said electrical amplifier, or wherein said control unit turns said electrical amplifier directly off, by providing said control signal to said electrical amplifier.

14. Method of optical data transmission, comprising generating an optical transmission signal, using a laser transmission unit, controlling said laser transmission unit, such that said optical transmission signal is modulated in dependence on a data signal, using at least one driving unit, converting at least a fraction of a received optical signal into an electrical measurement signal, using an optical reception unit the comprises a photo diode and an electrical amplifier, wherein said optical reception unit is separate from said laser transmission unit, controlling said laser transmission unit, such that said optical transmission signal is modulated in dependence on a measurement signal, using at least one control unit, comprising furthermore, measuring multiple electrical measurement signals during a measurement interval and determine an averaged received electrical measurement signal based on the measured signals, and controlling said electrical amplifier, such that said electrical amplifier is turned off during at least a fraction of a time interval prior to said measurement interval, using said control unit.

\* \* \* \* \*